United States Patent [19]

Miura et al.

[11] Patent Number: 4,878,123
[45] Date of Patent: Oct. 31, 1989

[54] IMAGE PROCESSING APPARATUS HAVING IMAGE MEMORY

[75] Inventors: Shigeo Miura; Masatomo Takahashi; Motoaki Yoshino; Tsunehiro Watanabe, all of Tokyo; Takeshi Toyama, Hiratsuka; Taketo Takahashi, Tokyo, all of Japan

[73] Assignee: Canon Kabushiki Kaisha, Tokyo, Japan

[21] Appl. No.: 291,397

[22] Filed: Dec. 27, 1988

Related U.S. Application Data

[63] Continuation of Ser. No. 80,074, Jul. 31, 1987, abandoned.

[30] Foreign Application Priority Data

Aug. 4, 1986 [JP] Japan .............................. 61-119543[U]
Dec. 27, 1986 [JP] Japan ................................ 61-312667

[51] Int. Cl.⁴ ......................... H04N 1/00; H04N 1/04
[52] U.S. Cl. .................................... 358/401; 358/404; 358/444
[58] Field of Search ............... 358/256, 280, 293, 257, 358/294; 355/145 H

[56] References Cited

U.S. PATENT DOCUMENTS 4,622,594 11/1986 Homjo et al. ...................... 358/280
4,695,898 9/1987 Nagashima .......................... 358/280

Primary Examiner—Edward L. Coles, Sr.
Attorney, Agent, or Firm—Fitzpatrick, Cella, Harper & Scinto

[57] ABSTRACT

An image processing apparatus comprises: a processor to process image data of an orginial document; an image memory to store the image data; a single manual switch; a detector to detect the depression time of the manual switch; a selector to select whether all of the image data is stored or not in accordance with the depression time; and a discriminating circuit to discriminate whether the number of partner apparatuses to perform the transmission in the processor is one or plural. When one partner apparatus is designated, the image data is directly transmitted. When a plurality of partner apparatuses are designated, the image data is once stored into the image memory and thereafter, the image data in the memory is transmitted. Either the single copy mode or the multi copy mode is sequentially periodically selected in accordance with the depression time of the manual switch, i.e., copy start key. With this apparatus, either the image data of the original document or the image data in the memory is automatically selected and transmitted by the simple operating procedure.

28 Claims, 10 Drawing Sheets

IMAGE PROCESSING APPARATUS HAVING IMAGE MEMORY

This application is a continuation of application Ser. No. 080,074 filed July 31, 1987, now abandoned.

BACKGROUND OF THE INVENTION

1. Field of the Invention

The present invention relates to an image processing apparatus such as a facsimile apparatus or the like and, more particularly, to an image processing apparatus having an image memory.

2. Related Background Art

Hitherto, there have been known apparatuses disclosed in U.S. Pats. Nos. 4,695,672 and 4,737,804 and in U.S. patent application Ser. No. 823,243. In these apparatuses, in the multi copy mode, image data is recorded to the first sheet and also stored into an image memory, and the image data is read out of the image memory and recorded to the second and subsequent sheets.

In the apparatus disclosed in U. S. patent application Ser. No. 755,361, when the line is busy, image data is stored into the memory.

In those conventional apparatuses, it is unnecessary for the operator to select whether image data is stored into the memory or not.

On the other hand, there have conventionally been known facsimile apparatuses as disclosed in U.S. Pat. Nos. 4,502,080 and 4,567,322. In these apparatuses, the transmission, reception, copying, or the like is executed by a single manual switch.

However, according to these conventional apparatuses, either one of the transmission, reception, and copy modes is selected by a single manual switch on the basis of the presence or absence of an original document or the presence or absence of the designated communication partner and is executed. Therefore, the selection between the single copy mode and the multi copy mode cannot be performed.

Accordingly, either the single copy mode or the multi copy mode must be set and the copy operation must be performed by complicated key operations using a plurality of keys; this method is inconvenient because complicated key operations are executed and additional keys are provided.

On the other hand, in the conventional facsimile apparatus having an image memory, when the multipleaddress transmission or the like is sequentially performed, i.e., when the image data of the same original document is transmitted to a plurality of communication partners, all of the image data is stored into an image memory and thereafter, it is transmitted. When the image data of an original document is transmitted to a single communication partner, all of the image data is transmitted without being stored into the image memory.

However, in this case as well, a key such as "memory storage key" or the like must be used to select either one of two modes with respect to whether or not all of the image data is stored into the image memory. Thus, there are drawbacks such that the operating procedure becomes complicated and the cost increases due to an increase in number of keys.

SUMMARY OF THE INVENTION

The present invention is made in consideration of the foregoing conventional techniques and it is an object of the invention to provide an image processing apparatus which selects by a simple operation whether or not all of the image data is stored into an image memory.

Another object of the invention is to provide an image processing apparatus which discriminates whether or not all of the image data is stored into an image memory in accordance with a period of time of the depression of a single manual switch.

Still another object of the invention is to provide an image processing apparatus which transmits all of the image data without storing into an image memory or transmits all of the image data after it was stored into the image memory in accordance with whether the number of transmission partners is one or plural.

Still another object of the invention is to provide an image processing apparatus which selects a single copy mode or a multi copy mode in accordance with a period of time of the depression of a single manual switch.

Still another object of the invention is to provide an image processing apparatus which discriminates whether or not all of the image data is stored into an image memory in accordance with the single copy mode or the multi copy mode.

The above and other objects, operations, and advantages of the present invention will become apparent from the following detailed description and the appended claims with reference to the accompanying drawings.

DETAILED DESCRIPTION OF THE PREFERRED EMBODIMENTS

An embodiment of the present invention will be described in detail hereinbelow with reference to the drawings. Copy processes in a facsimile apparatus will be first explained as the first embodiment.

Figure 1:
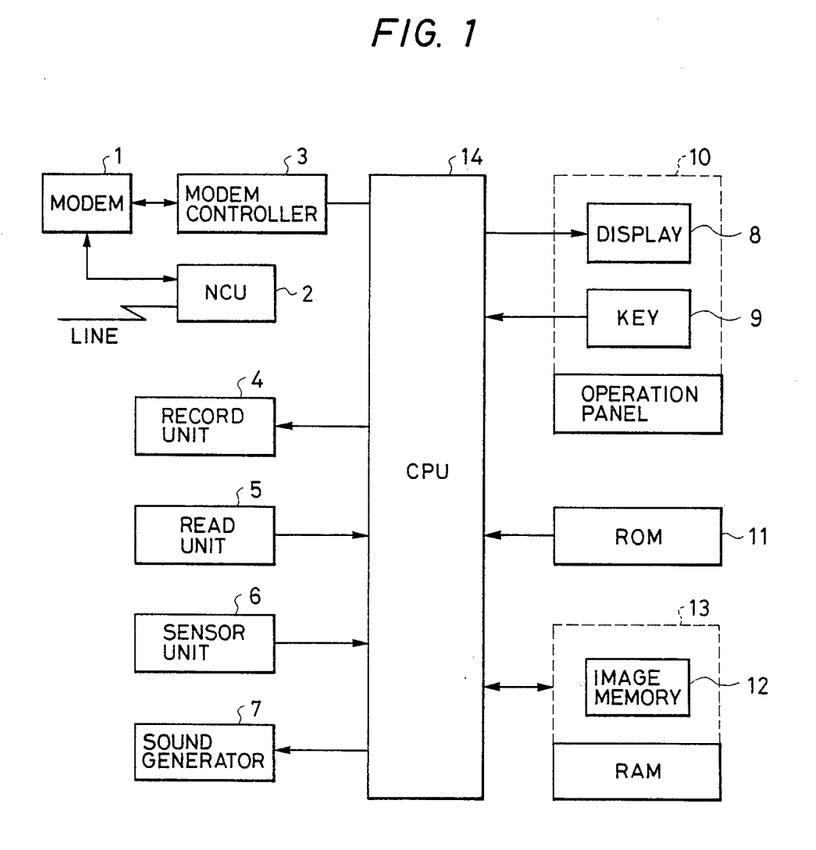
FIG. 1 is a diagram showing a block constitution of a facsimile apparatus as the first embodiment of the present invention.
Figure 2A:
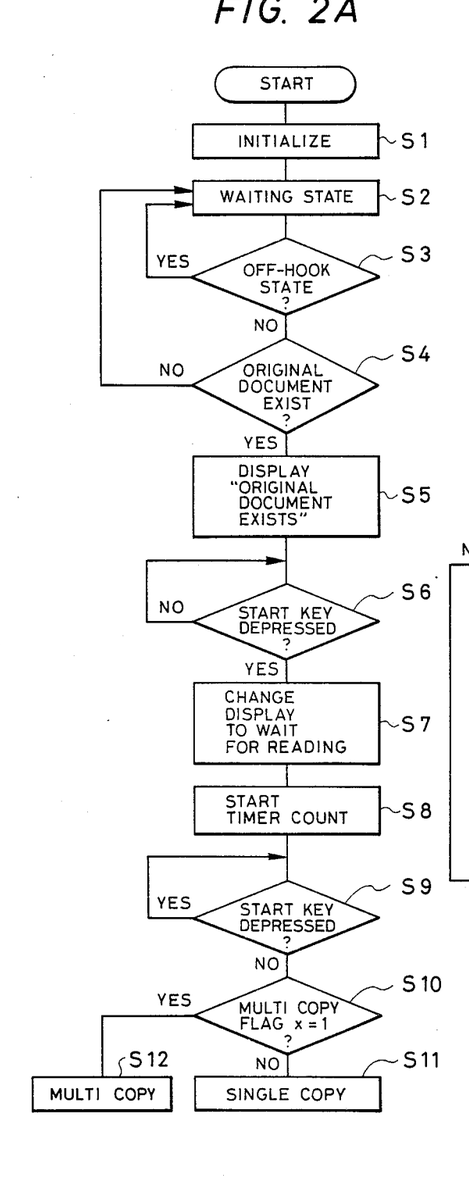
FIGS. 2A to 2C and FIGS. 3A and 3B are flowcharts showing the control operations which are executed in a CPU in FIG. 1.
Figure 2B:
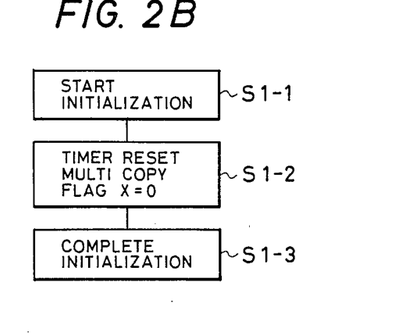
Figure 2C:
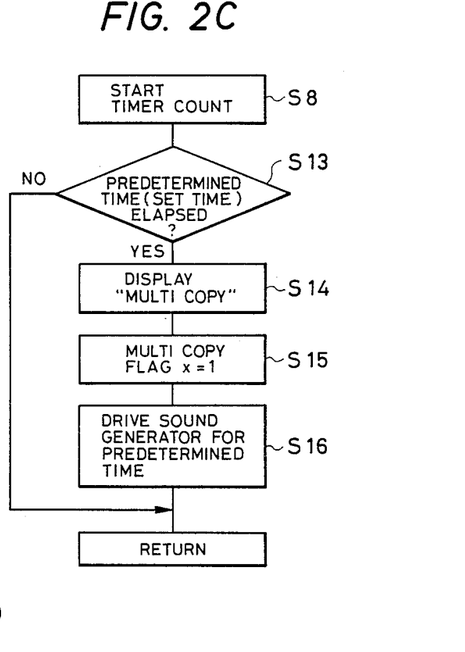
Figure 3A:
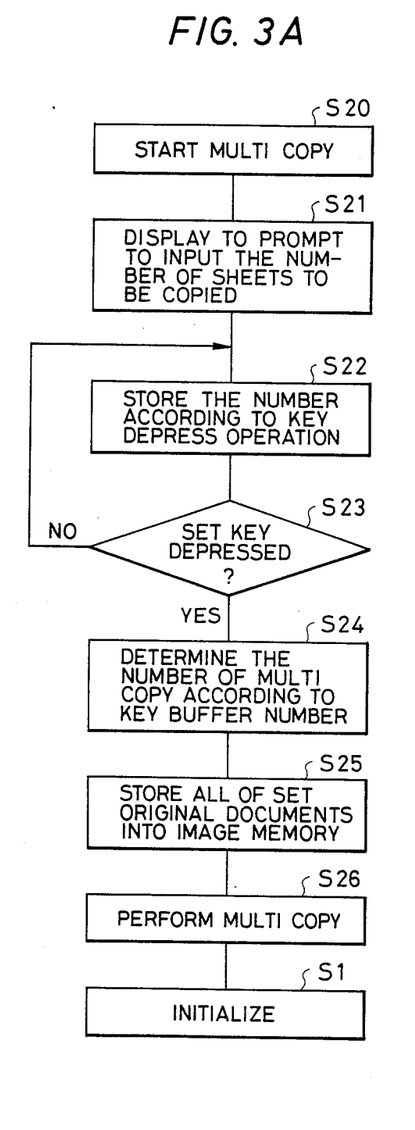
Figure 3B:
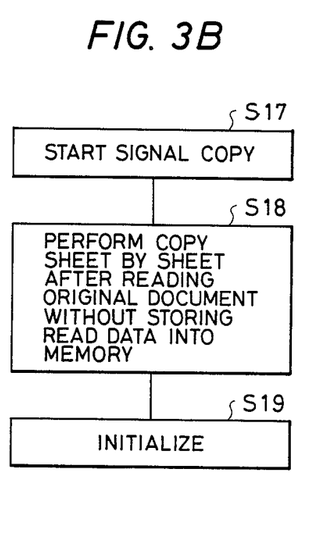
Figure 4:
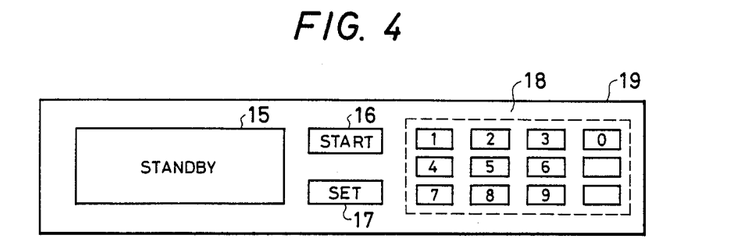
FIG. 4 is a diagram showing an operation panel of the facsimile apparatus.

(I) FIG. 1 shows a block constitutional diagram of the facsimile apparatus. In FIG. 1, reference numeral 1 denotes a modem to perform a communication; 2 is an NCU to connect the line with the side of a telephone set or with the modem; 3 a modem controller to control the modem 1 and NCU 2; 4 a record unit to record a received image or a copy of an original document in the copy mode onto a recording paper; 5 a read unit to read an original document by a CCD or the like; 6 a sensor unit to detect the presence or absence of a recording paper or original document; 7 a sound generator to inform the operator of the switching of the mode to the operator by a sound when the operating mode is switched or the like; 8 a display to display the state or the like of the facsimile apparatus to the operator; 9 a KEY consisting of numeral keys and the like; 10 an operation panel including the display 8 and KEY 9; 11 a ROM to store a control program for the facsimile apparatus; 12 an image memory to store the image data of the original document which was read by the read unit 5; 13 a RAM including the image memory 12; and 14 a central processing unit (CPU) to control all of the components 1 to 13 of the apparatus. FIGS. 2A to 2C are flowcharts showing the control which is executed by the CPU 14. FIG. 2A is the main flowchart for the processes until the discrimination with respect to whether the single copy mode has been set or the multi copy mode has been set is executed. FIG. 2B is a flowchart for initialization in FIG. 2A. FIG. 2C is a flowchart for a timer. FIG. 3A is a flowchart for the operation in the multi copy mode. FIG. 3B is a flowchart for the operation in the single copy mode. The single copy mode denotes that a sheet of copy is performed for a single original document. The multi copy mode means that a plurality of sheets of copies are performed for a single original document. In FIG. 4, reference numeral 15 indicates a display to display various kinds of states of the facsimile apparatus; 16 is a start key; 17 a set key; 18 numeral keys or other keys; and 19 an operation panel including the components 15 to 18.

Figure 5:
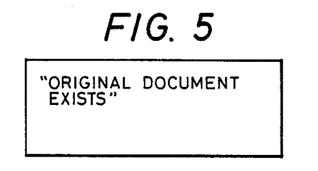
FIGS. 5 to 12 are diagrams showing display states in a display in FIG. 4.
Figure 6:
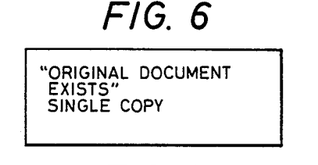
Figure 7:
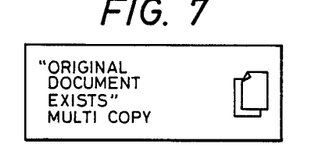

(II) In the foregoing constitution, first, the timer is reset and a multi copy flag is set to "0" for initialization (steps S1 - 1→S1 - 2→S1 - 3). When the facsimile apparatus is on standby and in the on-hook state, if the operator desires to copy an original document, the original document is put on an original document plate coupled with the read unit 5 in FIG. 1. At this time, the display 15 in FIG. 4 displays as shown in FIG. 5 (steps S2→S3→ S4→S5). When the operator depresses the start key 16 in FIG. 4, the display instantaneously displays as shown in FIG. 6. At the same time, the head portion of the original document is set onto an image sensor of the read unit by an automatic document feeder (ADF) attached to the original document plate so as to enable the reading of the original document to be started (steps S6→S7). Then, a timer provided in the CPU 4 in FIG. 1 is started (step S8). When the operator desires the single copy mode, by promptly releasing the key, the single copy mode is set (steps S9→S10→ S11). On the other hand, when the operator desires the multi copy mode, the operator continuously depresses the key. After the elapse of a predetermined time, the display display as shown in FIG. 7 and the multi copy mode is set and it is informed to the operator by a sound generator (steps S13→S14→S15→S16).

Figure 8:
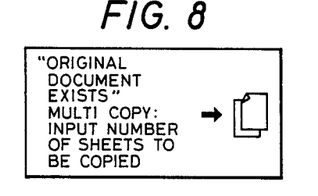
Figure 9:
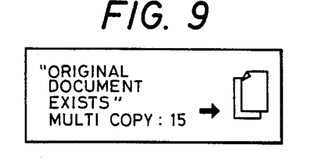
Figure 10:
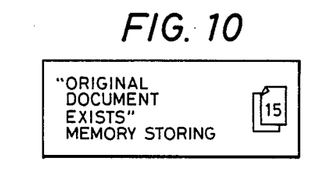
Figure 11:
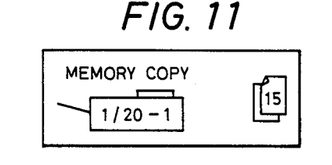
Figure 12:
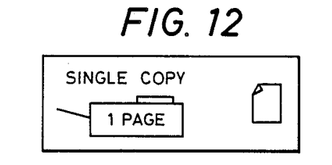

If the single copy mode is set when the start key was released, the facsimile apparatus executes the operation in the single copy mode such that after the image data of the original document was read by the read unit 5, the image data is directly copies one sheet by sheet for a single original document without storing all of the image data into the image memory 12 (steps S17→S18→S19). The display displays as shown in FIG. 12. Namely, the display 8 displays not only the copy mode but also the page number at which the copying operation is being performed. If the multi copy mode is set when the start key was released, the facsimile apparatus is set to the numeral key input mode and the display displays as shown in FIG. 8 (step S21). For example, if the operator desires the copy mode on a 15-sheet unit basis in this case, the numeral keys 18 in FIG. 4 are depressed in accordance with the order of 1→5. At this time, the display displays as shown in FIG. 9. Next, when the operator depresses the set key 17 in FIG. 4, the facsimile apparatus execute the multi copying operation to thereby copy on a 15-sheet unit basis after the image data of all of the original documents set on the original document plate was stored into the image memory (steps S22→S23→S24→S25→S26). In this case, when the image data of the original document is being stored into the image memory, the display 8 displays as shown in FIG. 10. When the image data read out of the image memory is being copied after completion of the storage of the image data into the image memory, the display displays as shown in e.g., FIG. 11. IN this example, it is indicated that the first copy of the first page of twenty original documents is being output.

After completion of foregoing single copying and multi copying operations, the facsimile apparatus is again initialized (step S1) and is reset to the standby state.

Figures 13A, 13B:
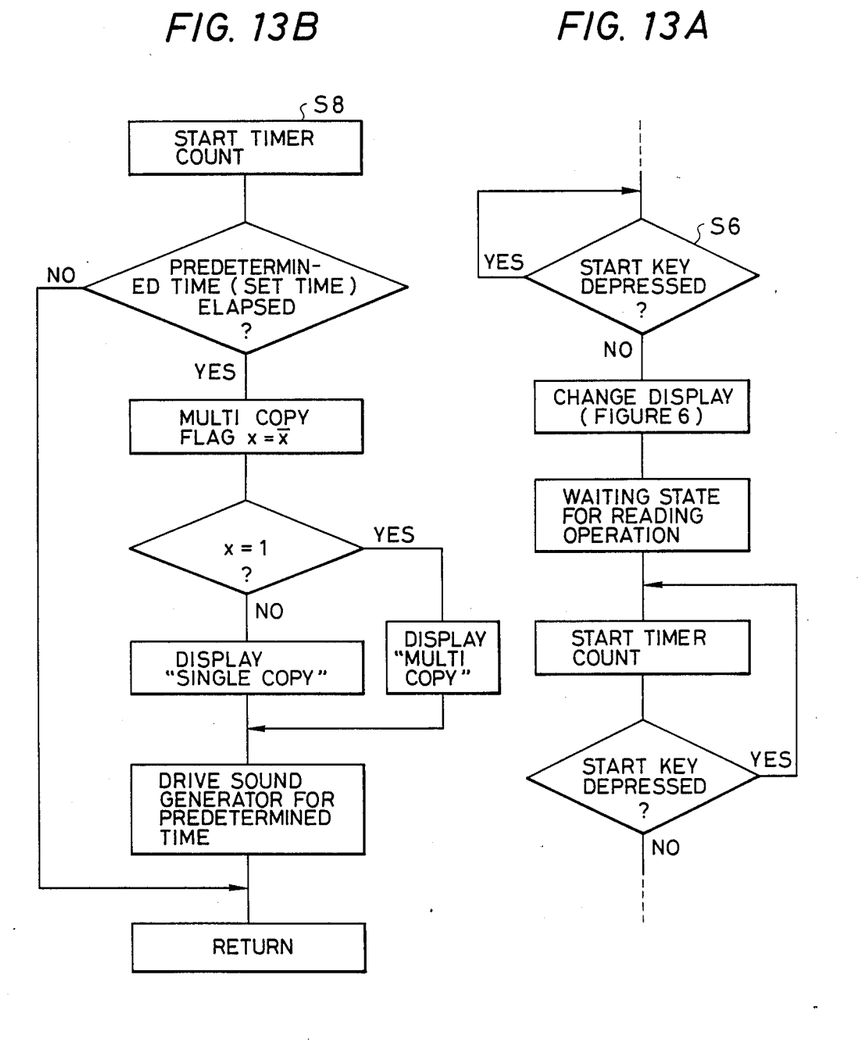
FIGS. 13A and 13B are flowcharts showing the control operation in another embodiment.

(III) FIGS. 13A and 13B show flowcharts in the case where parts of the flowcharts of FIGS. 2A and 2C were changed. In this case, the operating mode is periodically switched to the single copy mode → multi copy mode → single copy mode → multi copy mode → . . . . in dependence on the period of time of the depression of the start key.

As described above, according to the first embodiment, when the facsimile apparatus is set to the on-hook state, by detecting whether the start key has been depressed or not and by detecting the depression time of the start key, a discrimination is made to see if the operating mode has been set to the single copy mode or the multi copy mode and a check is also made to see if the image data has been stored into the image memory or not and thereafter, the copying operation is performed. Thus, it is possible to provide a facsimile apparatus having the functions of both the single copy mode and the multi copy mode in which any special key is unnecessary, electric energy and an image memory are not consumed unnecessarily, and the operation is easy.

On the other hand, by changing the display content of the display when the single copy/multi copy modes were switched by the foregoing operation, or by generating a sound from the sound generator for a predetermined period of time, the operator can certainly recognize whether the single copy mode or the multi copy mode has been set.

In another embodiment in which a part of the flowchart for the counting operation of a timer was changed, the single copy/multi copy modes are periodically switched in dependence on the depression period of time of the start key. Therefore, for example, there is an unexpected case where in spite of the fact that the operator had desired. e.g., the single copy mode, he depressed the start key for a long time than it is needed, so that the multi copy mode has been erroneously set. However, in this case, by the operator merely continuously depressing the start key, the operating mode is reset to the single cope mode. Therefore, the misoperation can be promptly corrected by the simple operation.

As described above, according to the foregoing embodiment, the multi copy mode or single copy mode can be designated by a single key. An image processing apparatus having a good operating efficiency can be provided.

Transmitting processes in the facsimile apparatus will now be described as the second embodiment.

Figure 14:
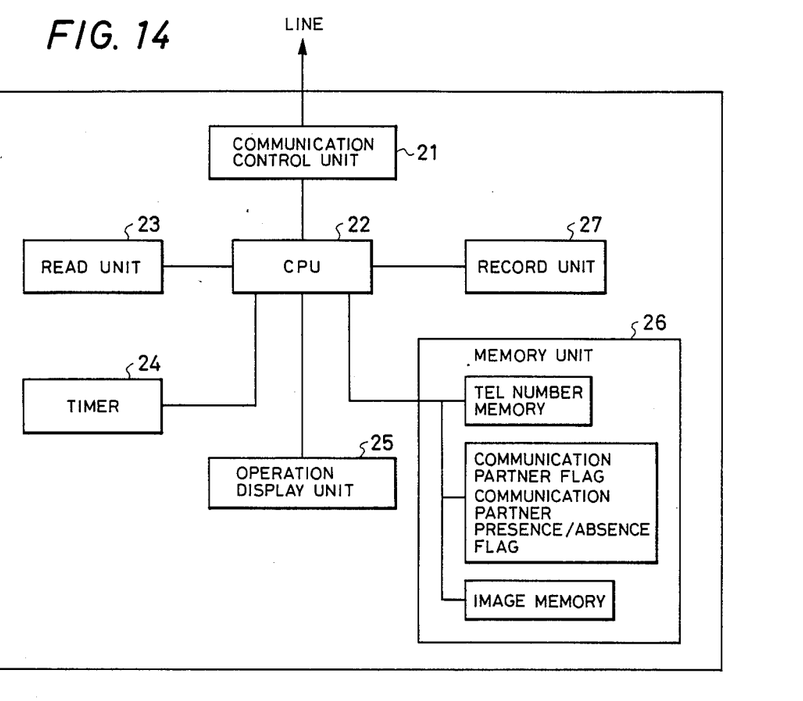
FIG. 14 is a block constitutional diagram of a facsimile apparatus as the second embodiment of the invention.
Figure 15A:
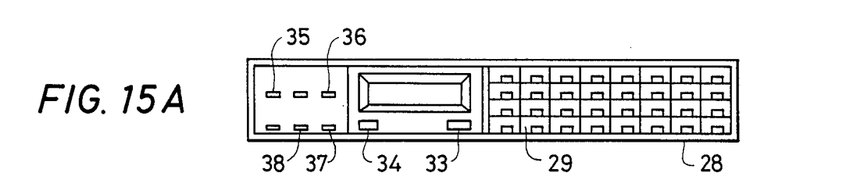
FIGS. 15A and 15B are diagrams showing an operation panel of the facsimile apparatus.
Figure 15B:
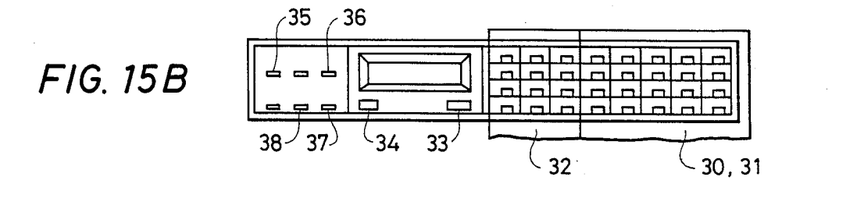

FIG. 14 is a system block diagram of the facsimile apparatus in the second embodiment of the invention. Reference numeral 21 denotes a communication control unit including a modem and an NCU; 23 is a read unit; 24 a timer; 25 an operation display unit; 26 a memory unit; 27 a record unit; 22 a main control unit which 23, 24, 25, 26, and 27; and 26 a memory unit consisting of a TEL number memory to store the TEL number of a communication partner and an image memory to store a communication partner flag, a communication partner presence/absence flag, and communication image data FIGS. 15A and 15B are diagrams showing an operation panel of the facsimile apparatus. FIG. 15A illustrates a state in which a panel cover 28 is open. FIG. 15B illustrates a closed state. In the diagrams, reference numeral 29 denotes a one-touch key; 30 a ten-key; 1 a data registration key; 32 a function key; 33 a start key; 34 a stop key; 35 a manual reception button/ lamp; 36 a TEL button/lamp; 37 a fine button/lamp; and 38 a half-tone button/lamp. The open/closed state of the panel is informed to the CPU 22 by the operation of a microswitch. In the ordinary communication to a single communication partner, by depressing the onetouch key 29 or the abbreviated dial of the ten-key 30, the number which has previously been registered into the memory or the number input by the ten-key 30 is output as a selection signal and the communication is performed. The start key 33 is used to finish the communication partner designating mode and to immediately start the communication.

Figure 16:
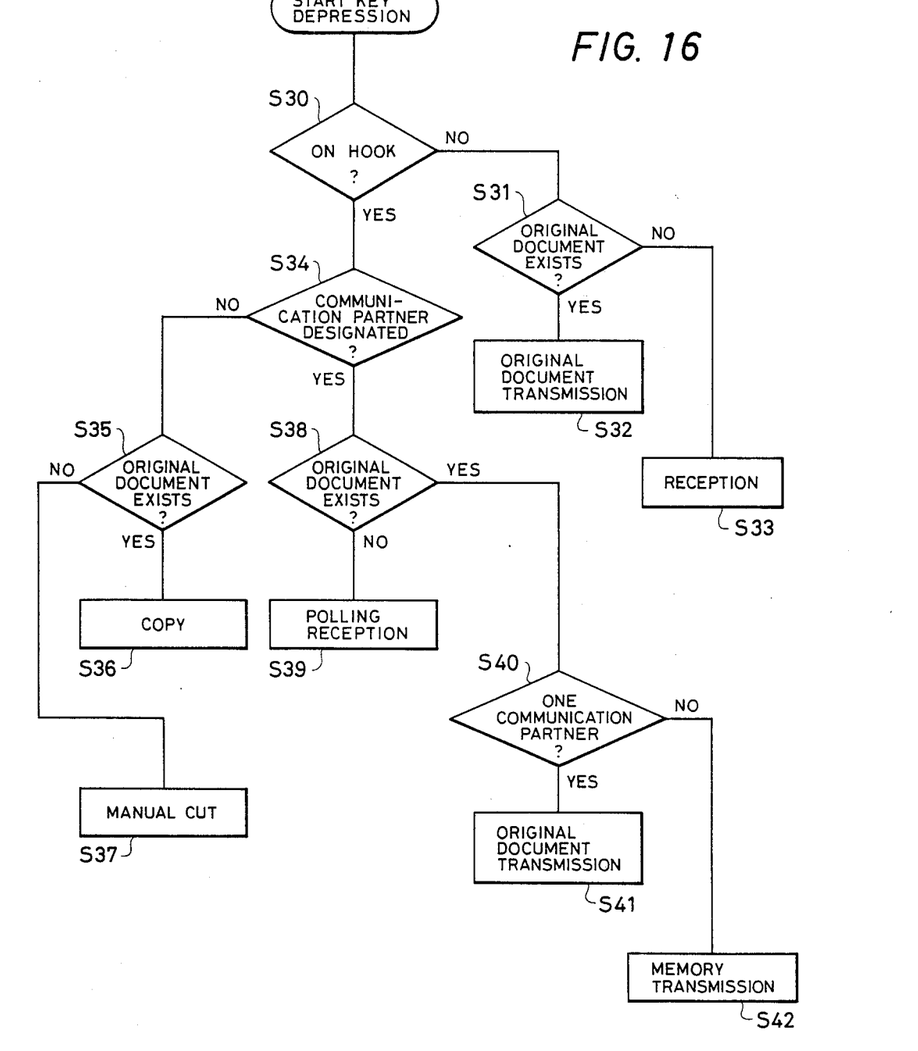
FIGS. 16 and 17 are flowcharts showing the control operation in the transmission mode of the embodiment of the invention.

FIG. 16 is a flowchart in the case where the start key 33 was depressed in the embodiment of the invention. The following control is executed by the CPU 22 on the basis of this flowchart. First, a check is made to see if the apparatus has been set to the on-hook state or not (step S30). If NO, i.e., when the apparatus is in the off-hook state, the image data of the original document is transmitted when the original document exists (steps S30→S31→S32). When no original document exists, the apparatus is set into the reception mode (steps S30→S31→S33). If YES in step S30, namely, when the apparatus is in the on-hook state, a check is made to see if a communication partner has been designated or not (step S34). Then, a check is made to see if an original document exists or not (step S38). If no communication partner is designated and the original document exists, the copying operation is performed (steps S34→S35→S36). If no partner is designated and no original document exists, the manual cutting operation is performed (steps S34→S35→S37). If a communication partner has been designated and no original document exists, the polling reception is executed (steps S34→S38→S39). If a partner has been designated and an original document exists, a check is made to see if a single communication partner has been designated or a plurality of partners have been designated (step S40). If a single partner has been designated, the image data of the original document is transmitted (steps S34→S38→S40→S41). If a plurality of partners have been designated, the memory transmission is performed (steps S34→S38→S40→S42).

Figure 17:
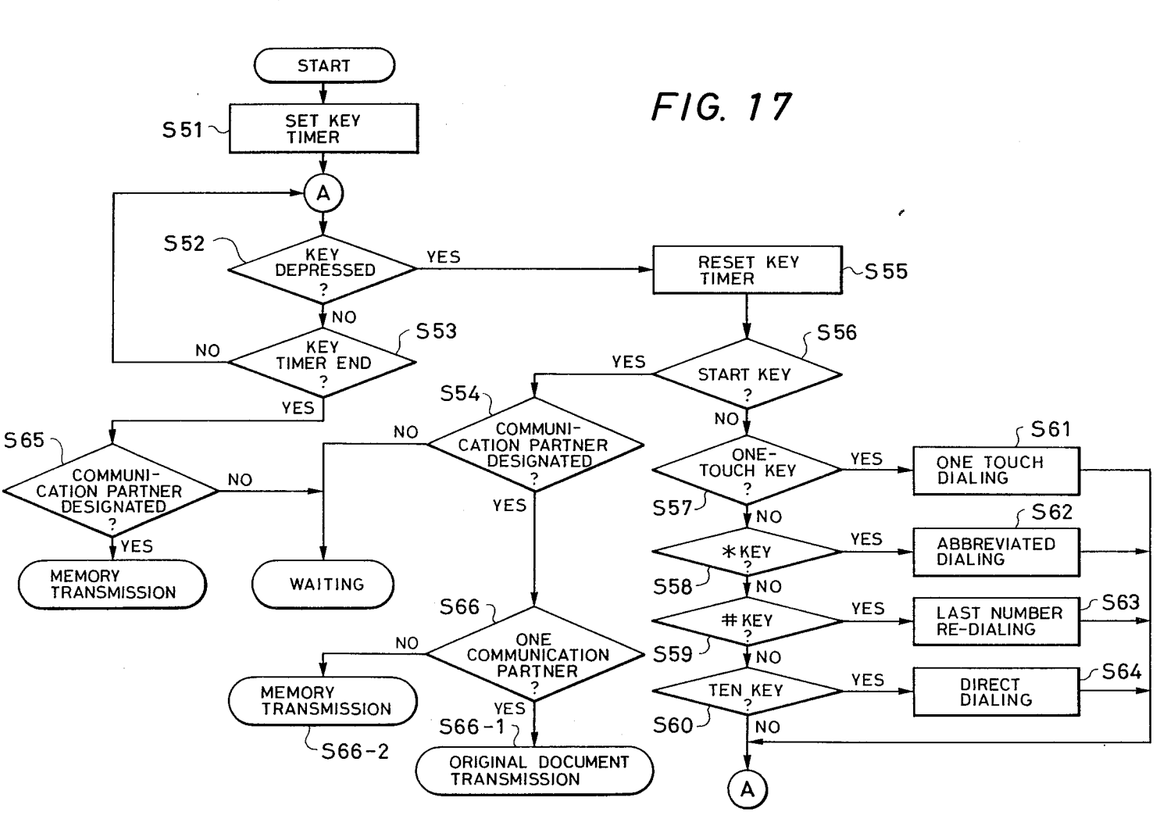

FIG. 17 is a flowchart to designate a communication partner in the actual key operation. The processes in this flowchart are started in the state in which the apparatus is in the on-hook state, an original document has been set, and a key other than the start key 33 has been depressed. In the first step S51, the key timer is set to five seconds. In step S52, a check is made to see if a key has been depressed or not. If YES, the processing routine advances to step S54 through steps S52→S55→S56. In step S54, a check is made to see if one or more communication partners have already been designated or not. If YES, a check is made to see if a single partner has been designated or a plurality of partners have been designated (step S66). If a single partner has been set, the image data of the original document is transmitted (step S66 - 1). If a plurality of partners have been designated, the memory transmission is performed (step S66 - 2).

The original document transmission denotes that a communication partner is first accessed by an automatic originating calling operation or the like and after the apparatus was connected with the partner, the image data of the original document is read by the read unit 23 and transmitted. The memory transmission means that the image data of the original document which was read by the read unit 23 is once stored into the memory unit 26 and thereafter, a communication partner is accessed and the image data stored in the memory is transmitted to this partner.

When a key is not depressed in step S52, step S65 follows after completion of the operation of the key timer (step S53). If a partner has been designated in step S65, the memory transmission is performed. If a partner is not designated, the processing routine jumps this flowchart and the apparatus enters the standby mode. If a key other than the start key has been depressed (step S56), the processes in steps S57 to S64 are executed. The detailed flowchart for these processes is shown in FIG. 18.

In this flowchart, the designation of a communication partner is discriminated by checking a communication partner presence/absence flag f. After either one of one-touch dialing, abbreviated dialing, last number redialing, and direct dialing was registered, the relevant communication partner flag is set. Then, a check is made to see if the communication partner presence/absence flag f has been set or not. If YES, the key timer is set to ten seconds. If NO, the flag f is set and the key timer is set to five seconds. If f=1, it is determined that the operator desires to register a plurality of communication partners. Therefore, the period of time of ten seconds is provided until the next registration. If f=0, it is decided that the operator desires to register a single communication partner. Therefore, the key timer is set to five seconds, thereby enabling the transmitting operation to be promptly executed.

Figure 18:
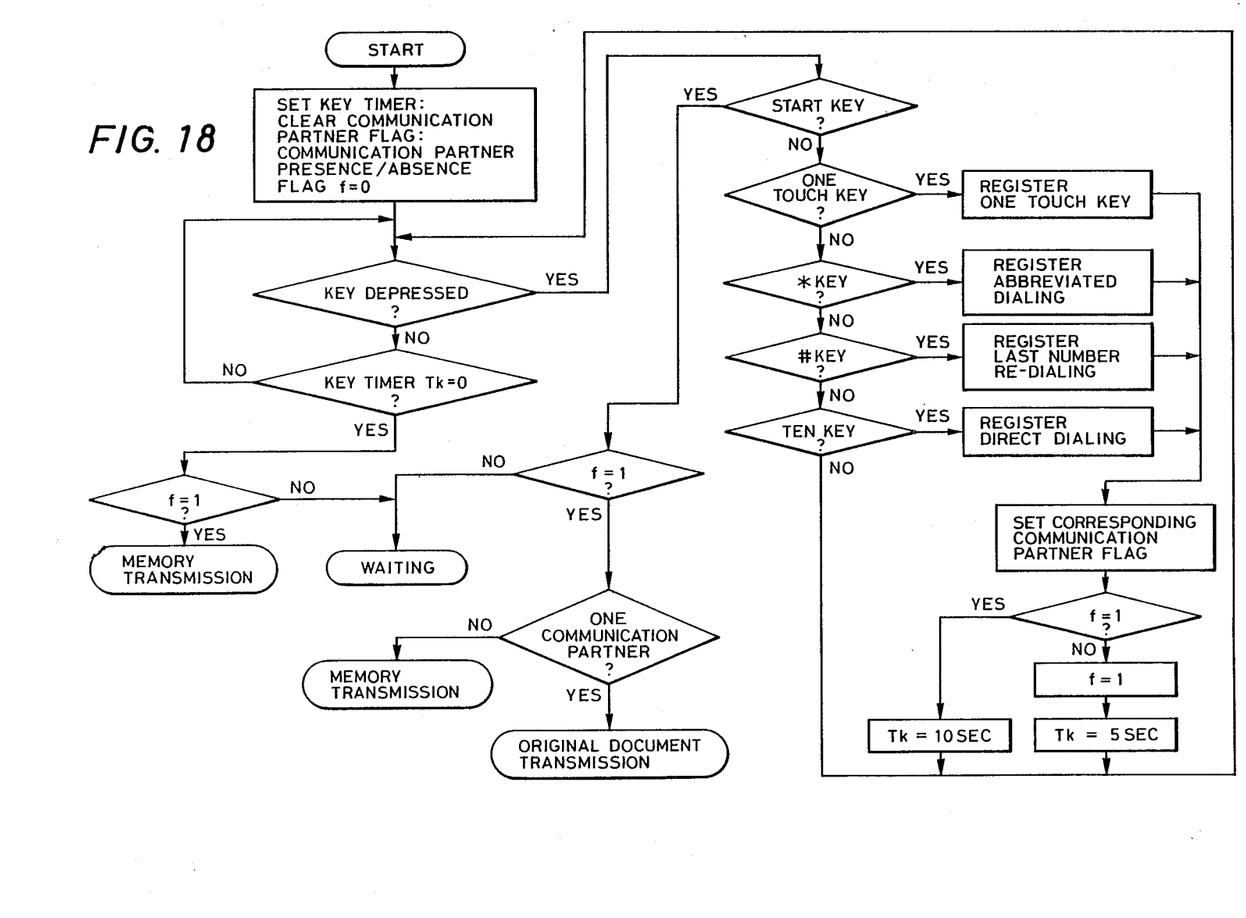
FIG. 18 is a flowchart showing the details of the operation in FIG. 17.
Figure 19:
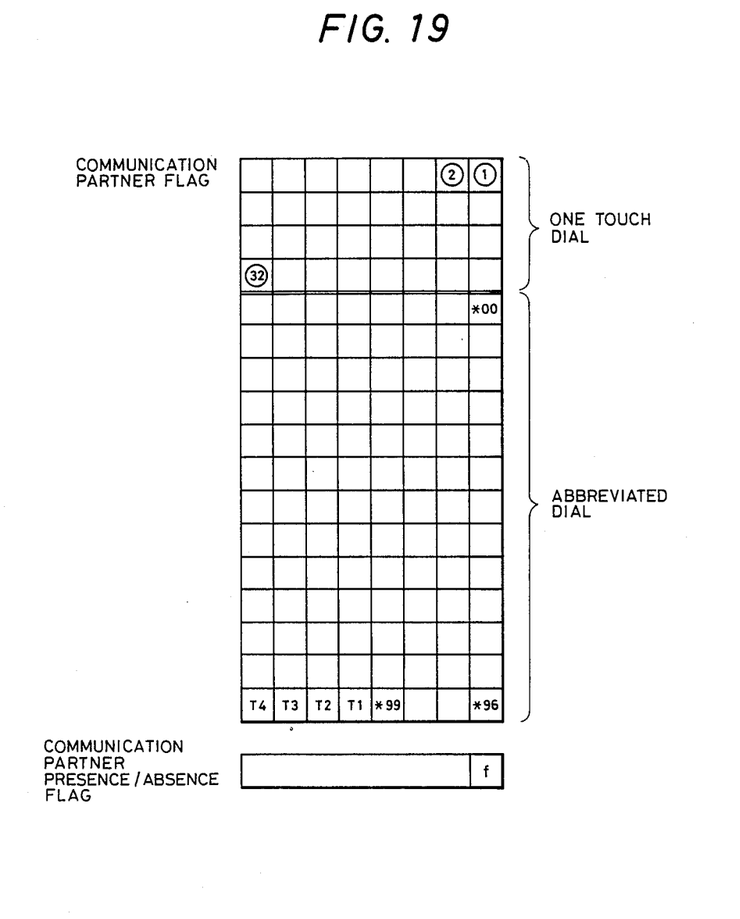
FIG. 19 is a memory map diagram of a telephone number of a communication partner.

FIG. 19 is a diagram for explaining a structure in the map memory unit 26 of the communication partner flag and communication partner presence/absence flag described in the flowchart of FIG. 18. One bit is assigned to each of total 136 communication partners of one-touch abbreviated dials ① to ㉜, abbreviated dials *00 to *99, and ten-key dials $T_1$ to $T_4$ for the communication partner flag. It is assumed that when this flag is set to 1, a communication partner has been designated and when the flag is set to 0, no communication partner is designated. After a communication partner was designated by the key operation, the relevant bit of the communication partner flag is set to 1 and at the same time, the communication partner presence/absence flag is set to 1 (indicating that the partner has been designated).

In the originating call, the bits are sequentially scanned from 0 to 136. When the bit of 1 is found out, the TEL number is read out of the TEL number memory (indicated at 26 in FIG. 14) corresponding to that bit number and the originating call is performed.

On the other hand, as mentioned in the foregoing first embodiment, it is also possible to arrange another embodiment in the following manner. Namely, if the communication start key has been depressed, the original document transmission is ordinarily performed and the image data is transmitted without storing all of the image data into the image memory. If the start key has been continuously depressed for a period of time longer than a predetermined time, the memory transmission is performed and after all of the image data was stored into the memory, it is transmitted.

As described above, there is no need to provide the means for selecting the input of the image data for the memory key as in the conventional apparatus, and either the memory transmission or the original document transmission is automatically selected by detecting the end of the set time of the key timer, by detecting the depression time of the start key, and by discriminating whether a single communication partner has been designated or a plurality of partners have been designated. Therefore, the operating procedure is simplified and the number of keys and the cost can be reduced.

Although the first and second embodiments have been described with respect to the facsimile apparatus as an example, the invention can be also applied to other image processing apparatuses.

The present invention is not limited to the foregoing embodiments but many modifications and variations are possible within the spirit and scope of the appended claims of the invention.

WHAT IS CLAIMED IS:

1. An image processing apparatus comprising:
   processing means for processing image data;
   an image memory to store said image data;
   one manual switch;
   detecting means for detecting a time of depression of said manual switch; and
   selecting means for selecting whether all of the image data is stored into the image memory or not in accordance with the result of the detection of said detecting means.

2. An apparatus according to claim 1, wherein said processing means transmits the image data to a partner apparatus.

3. An apparatus according to claim 2, further having deciding means for discriminating whether the number of partner apparatuses to perform the transmitting process in said processing means is one or plural.

4. An apparatus according to claim 3, wherein when it is determined that the number of partner apparatuses is one by said deciding means, said selecting means selects that all of the image data is not stored into the image memory, and when it is decided that the number of partner apparatuses is a plural, the selecting means selects that all of the image data is stored into the image memory.

5. An apparatus according to claim 1, wherein said processing means does not store all of the image data into the image memory or stores all of the image data into the image memory in accordance with the result of the selection of said selecting means.

6. An apparatus according to claim 1, wherein said processing means copies the image data.

7. An apparatus according to claim 6, further having discriminating means for discriminating whether the number of copy sheets in said processing means is one or plural for a single original document.

8. An apparatus according to claim 7, wherein when it is determined that the number of copy sheets is one for a single original document by said discriminating means, said selecting means selects that all of the image data is not stored into the image memory, and when it is decided that the number of copy sheets is plural for a single original document, the selecting means selects that all of the image data is stored into the image memory.

9. An apparatus according to claim 1, further having display means for displaying a mode in which the image data is stored into the image memory or a mode in which the image data is not stored into the image memory.

10. An apparatus according to claim 9, wherein said display means discriminates and displays the mode in which the image data is stored into the image memory or the mode in which the image data is not stored into the image memory in accordance with the result of the detection of said detecting means.

11. An apparatus according to claim 1, further having a discriminating means for discriminating whether the number of processes in said processing means is one or plural.

12. An apparatus according to claim 11, wherein when it is decided that the number of processes is one by said discriminating means, said selecting means selects that all of the image data is not stored into the image memory, and when it is decided that the number of processes is plural, the selecting means selects that all of the image data is stored into the image memory.

13. An image processing apparatus comprising:
   transmitting means for transmitting image data of an original document to a transmission partner;
   an image memory to store the image data of the original document;
   discriminating means for discriminating whether the number of transmission partners in said transmitting means is one or plural; and
   selecting means for selecting whether all of the image data is transmitted by said transmitting means without being stored into the image memory or after all of the image data was stored into the image memory, it is transmitted in accordance with the result of the discrimination of said discriminating means.

14. An apparatus according to claim 13, further having instructing means for instructing the start of the transmission in said transmitting means.

15. An apparatus according to claim 14, wherein said discriminating means discriminates whether an instruction time in said instructing means is below a predetermined time or above said predetermined time.

16. An apparatus according to claim 15, wherein when it is decided by said discriminating means that the instruction time is below said predetermined time, said selecting means selects that all of the image data is not stored into the image memory, and when it is decided that the instruction time is above the predetermined time, the selecting means selects that all of the image data is stored into the image memory.

17. An apparatus according to claim 16, wherein said transmitting means transmits the image data without storing all of the image data into the image memory, or, after all of the image data was stored into the image memory, the transmitting means transmits the image data in accordance with result of the selection of said selecting means.

18. An apparatus according to claim 13, wherein said discriminating means discriminates whether or not a predetermined time elapsed after a key had been finally operated.

19. An apparatus according to claim 18, wherein said selecting means selects that the image data is stored into the image memory when the elapse of the predetermined time was discriminated by said discriminating means.

20. An image processing apparatus comprising:
    copy means for performing a single copy or a multi copy for a single original document;
    one manual switch;
    detecting means for detecting a time of depression of said manual switch; and
    selecting means for selecting whether the single copy is performed or the multi copy is performed by said copy means in accordance with the depression time which is detected by said detecting means.

21. An apparatus according to claim 20, further having an image memory to store the image data of said original document.

22. An apparatus according to claim 21, wherein when said selecting means selects the single copy, said copy means performs the copy without storing all of the image data into the image memory, and when the selecting means selects the multi copy, the copy means stores all of the image data into the image memory and performs the copy.

23. An apparatus according to claim 20, further having display means for displaying a mode in which the copy means performs the single copy or a mode in which the copy means performs the multi copy.

24. An apparatus according to claim 23, wherein said display means discriminates and displays the single copy mode or the multi copy mode in accordance with the depression time which is detected by said detecting means.

25. An image processing apparatus comprising:
    transmission means for transmitting image data;
    copy means for creating a single copy or a plurality of copies for a signal original document;
    a manual switch having at least a pressed state for instructing data transmission by said transmission means;
    detection means for detecting said depressed state of said manual switch; and
    selection means for selecting whether the single copy or the plurality of copies is to be created by said copying means in accordance with the depressed state detected by said detection means.

26. An apparatus according to claim 25, further comprising an image memory for storing the image data of said original document.

27. An apparatus according to claim 26, wherein when said selection means selects a single copy, said copy means creates the single copy without storing all of the image data in said image memory, and when selection means selects the plurality of copies, said copy means stores all of the image data into said image memory and creates the plurality of copies.

28. An apparatus according to claim 25, wherein said detection means detects a time of depression of said manual switch in said depressed state.

* * * * *

UNITED STATES PATENT AND TRADEMARK OFFICE
CERTIFICATE OF CORRECTION

PATENT NO. : 4,878,123

DATED : October 31, 1989

INVENTOR(S) : SHIGEO MIURA ET AL.

Page 1 of 2

It is certified that error appears in the above-identified patent and that said Letters Patent is hereby corrected as shown below:

TITLE PAGE:

AT [30]

Foreign Application Priority Data,
        "Japan........61-119543[U]" should read
        --Japan........61-119543--.

COLUMN 1

Line 15, "U.S. Pats. Nos. 4,695,672 and 4,737,804" should read --U.S. Pats. Nos. 4,695,895, 4,731,672 and 4,737,804--.

COLUMN 3

Line 4, "to the" should be deleted.
    Line 5, "operator" should be deleted.
    Line 62, "copies one" should read --copied--.

COLUMN 5

Line 11, "which 23," should read --which mainly consists of a CPU to control the components 23,--.
    Line 21, "1a" should read --31a--.

COLUMN 7

Line 61, "a" should be deleted.

COLUMN 8

Line 48, "or after" should read --or whether, after--.

UNITED STATES PATENT AND TRADEMARK OFFICE
CERTIFICATE OF CORRECTION

PATENT NO. : 4,878,123

DATED : October 31, 1989

INVENTOR(S) : SHIGEO MIURA ET AL.

Page 2 of 2

It is certified that error appears in the above-identified patent and that said Letters Patent is hereby corrected as shown below:

COLUMN 9

Line 4, "result" should read --the result--.

COLUMN 10

Line 13, "signal" should read --single--.
Line 30, "selection means" should read --the selection means--.

Signed and Sealed this

Ninth Day of April, 1991

Attest:

HARRY F. MANBECK, JR.

Attesting Officer

Commissioner of Patents and Trademarks